United States Patent [19]

Morikawa et al.

[11] Patent Number: 5,847,521
[45] Date of Patent: Dec. 8, 1998

[54] METHOD AND APPARATUS FOR DRIVING AN ELECTRIC MOTOR

[75] Inventors: Masatoshi Morikawa, Hanno; Kunio Seki, Hinode-machi; Yasuhiko Kokami, Takasaki, all of Japan

[73] Assignee: Hitachi, Ltd., Tokyo, Japan

[21] Appl. No.: 684,343

[22] Filed: Jul. 19, 1996

[30] Foreign Application Priority Data

Jul. 20, 1995 [JP] Japan ................................. 7-183824

[51] Int. Cl.$^6$ ....................................................... H02P 7/00
[52] U.S. Cl. ........................... 318/254; 318/439; 323/246; 323/320
[58] Field of Search .................................. 318/254, 138, 318/439, 798, 808; 323/237, 246, 320, 349

[56] References Cited

U.S. PATENT DOCUMENTS

| | | | |
|---|---|---|---|
| 3,937,974 | 2/1976 | Lafuze | 290/46 |
| 4,169,990 | 10/1979 | Lerdman | 318/138 |
| 5,264,774 | 11/1993 | Ito | 318/798 |
| 5,481,166 | 1/1996 | Moreira | 318/254 |
| 5,569,988 | 10/1996 | Kokami et al. | 318/254 |

FOREIGN PATENT DOCUMENTS

| | | |
|---|---|---|
| 5-137384 | 6/1993 | Japan . |
| 5-161387 | 6/1993 | Japan . |

OTHER PUBLICATIONS

"Small Motor Control ICS", by H. Kato, Kogyo Chosakai, Kogyo Chousa–kai, Japan.
*NEC Research & Development*, "Power MOS IC for HDD Motor Drive", by M. Hattori et al., vol. 32, No. 3, Jul. 1991.

*Primary Examiner*—John W. Cabeca
*Attorney, Agent, or Firm*—Antonelli, Terry, Stout & Kraus, LLP

[57] ABSTRACT

A motor drive method and apparatus for reducing noise of a motor. The motor drive apparatus includes first, second and third half bridge circuits. Each of the first, second and third half bridge circuits includes a first transistor which is adapted to form a current path between a first operational potential and an output terminal thereof and a second transistor which is adapted to form a current path between a second operational potential and the output terminal thereof. Each of the output terminals are connected to the corresponding drive coil of a motor. Each of the first and second transistors includes a control terminal to which a control signal is supplied. The motor drive apparatus detects a counter-induced voltage of the drive coil corresponding to the second half bridge circuit by supplying control signals to the first and second transistors thereof for making each current path therein a non-conducting state, and for forming current paths in the first transistor of the first half bridge circuit and in the second transistor of the third half bridge circuit respectively. Further the motor drive apparatus cuts off the current path of the first transistor in the first half bridge circuit, forms it and cuts it off again by supplying a control signal thereto after start of supplying a control signal for forming the current path of the first transistor in the second half bridge circuit. A control signal for forming the current path is supplied to the control terminal of the second transistor in the third half bridge circuit.

5 Claims, 12 Drawing Sheets

TOP FACE

FIG. 12(b)

BOTTOM FACE

METHOD AND APPARATUS FOR DRIVING AN ELECTRIC MOTOR

BACKGROUND OF THE INVENTION

The present invention relates to a method and apparatus for driving a motor, and in particular, it relates to a method and apparatus for driving a compact and high-precision brushless motor for use in office automation equipment-related electric machines reliably, at a high efficiency and at a reduced cost.

Various types of motors are used everyday in various fields of applications including heavy electrical machines, automobiles, home appliances and OA equipment. Their drive methods are also different from each other according to their types of motors and objects of use. Above all, a DC brushless motor or a so-called spindle motor is widely used in a hard disk drive (hereinafter referred to as HDD) for turning the disk because it has a relatively simple drive circuit and high reliability in long-time operation.

Recently, there has been a demand for a more compact and thin- sized HDD. To accomplish it, a sensorless type motor has been used. The sensorless motor eliminates position detection sensors for detecting the position of the rotor and is adapted instead to judge the position thereof by detecting an induced voltage of the motor. An example of such a motor drive is disclosed in Japanese Patent Laid-open No. 5-161387, in which each of voltage levels to be applied to drive coils is set to be positive(+) level in a range of 0–120 degrees of electrical angle, at 0 in a range of 120–180 degrees, negative(−) level in a range of 180–300, and at 0 in a range of 300–360 degrees, wherein a counter-induced voltage at each drive coil is detected during the period when the voltage level is 0. The counter-induced voltage is a voltage induced by the rotating rotor.

Further, Japanese Patent Laid-open No. 5-137384 discloses apparatus which conducts a current of each transistor of each half bridge longer than 120 degrees in order to prevent the phase current through each coil from decreasing temporarily at the term of phase change-over in the three-phase motor. The phase current contributes to torque of the motor especially at the term of phase change.

On the other hand, there is described an integrated driver circuit for driving an HDD spindle motor using the pulse width modulation (PWM) signal in three-phase rectangular waves in NEC Res. & Develop., Vol. 32, No. 3, pp. 368–378, July 1991. This discloses three-phase bridge circuits having six n-channel power MOS FETs, a phase generator which controls the switching of drivers therefor, a selector which sets the timings for three-phase switching, a detection circuit which detects an induced voltage induced in a motor coil, a PWM circuit which sets the duty of the PWM voltage by comparing a phase control error voltage with an output sense voltage, and so on. Further, in this integrated circuit, a snubber circuit comprised of a resistance and a capacitance is externally provided to each output terminal in order to absorb electrical noises generated during an operation of the motor. This integrated circuit has an induced voltage detection circuit which detects each difference voltage between a corresponding output voltage of each phase and a neutral potential of the three phase coils as an induced voltage induced in the motor. The integrated circuit also has a selector which provides a timing of driving the bridge circuit according to the induced voltage. At that time, the difference voltage between a sensed voltage from the current detection resistance which is connected to the bridge circuit and an error voltage corresponding to the target number of rotation is taken, and the difference voltage is compared with a triangular waveform voltage of about 100 kHz to determine the duty of the PWM signal. Further, according to the information from the selector, a phase generator forms a drive voltage, then the rectangular wave is supplied to an upper arm transistor in the three phase bridge circuit and the PWM signal is supplied to a lower arm transistor therein. For example, assuming that the upper arm transistor on the U phase among three phases of U, V and W is in ON state, and that the lower arm transistor on the V phase is in PWM operation, an output current flows from the power supply to the V phase lower arm through the U phase upper arm and the coil when the lower arm on the V phase is in ON state, and the output current flows through the diode between the source and drain of the V-phase upper arm to return to the power supply when the lower arm on the V phase is in OFF state (circulating condition). Through repetition of the above, the output current flows in the rectangular waveform with a 120-degree current conduction. In this reference, the power consumption of this circuit is reduced more than the conventional rectangular wave linear drive method because of the PWM control.

In Japanese Patent Laid-open No. 5-161387 reference, the voltage level changes rapidly from positive(+) level to 0 at an electrical angle of 120 degrees. So there occur electrical noise and acoustic noise due to the rapid change in currents (i.e. Ldi/dt (where L: the inductance of the motor coil, di/dt: the rate of change with time of the output current)), which causes a problem that adversely affects the control system or produces noise.

Also in the aforementioned reference, although an attempt has been made to reduce power consumption through PWM control of the output current in rectangular waveforms, since a rapid current change occurs at the time of transition from the bridge circuit drive period to the motor induced voltage detection period, thereby causing a problem of occurrence of electrical noise and acoustic noise, a countermeasure to reduce such noises has been taken by providing a snubber circuit which is externally coupled to the output terminal. However, providing such a snubber circuit externally results in other problems such as increases of assembly work, the number of parts, packaging capacity, and the like.

It is assumed that the above-mentioned reference is based on the three-phase full-wave method according to the "Small Motor Control ICs(IC)" by Hajime Kato which appears on page 57, published by Kogyo Chousa-kai, Japan. It is further assumed that the reference could not avoid the occurrence of noises since switching between the bridge circuits has been carried out at every electrical angle of 120 degrees.

On the other hand, in the Japanese Patent Laid-open No. 5-137384, its electrical angle is set greater than 120 degrees. However, since its voltage level is changed abruptly from the high level to the low level, there still remains the same problem as in the above- mentioned Japanese Patent Laid-open No. 5-161387. There is still another problem that a detection circuit using a Hall sensor must be provided to the motor. It is assumed that there is no need to measure any counter-induced voltage between electrical angles of 120 degrees and 180 degrees since the detection circuit using a Hall sensor is provided, and thus conduction period is eventually set greater than the electrical angle of 120 degrees, in this publication.

SUMMARY OF THE INVENTION

The object of the present invention is to provide a method and apparatus for driving a motor which can reduce motor noise.

The above-mentioned object of the invention can be accomplished by a method or apparatus having function of:

a first step to detect a counter-induced voltage of a drive coil corresponding to a second half bridge circuit of three half bridge circuits by supplying control signals to first and second transistors thereof for making each current path therein a non-conducting state (OFF-state), and control signals for forming current paths in a first transistor of a first half bridge circuit of the three half bridge circuits and in a second transistor of a third half bridge circuit of the three half bridge circuits respectively, and a second step, after the first step, to cut off the current path (make OFF-state) of said first transistor in said first half bridge circuit, form it (make ON-state) and cut it off (make OFF-state) again by supplying a control signal thereto after start of supplying a control signal for forming the current path of said first transistor in said second half bridge circuit, wherein a control signal for forming the current path is supplied to the control terminal of said second transistor in said third half bridge circuit.

A current starts to flow through a second-phase drive coil in the motor after starting supply of the control signal to the control terminal of the first transistor in the second half bridge circuit for forming its current path while the control signal to the control terminal of the second transistor in the third half bridge circuit is supplied to form its current path. At this instant, when the current paths of the first and the second transistors in the first half bridge are cut off, the current flowing through the first phase drive coil is cut off instantaneously, thereby causing a much noise to occur. In this invention, a control signal to the control terminal of the first transistor in the first half bridge circuit is supplied to cut off its current path, form it and cut it off again after starting to supply a control signal to the control terminal of the first transistor in the second half bridge circuit so that the current flowing through the first phase drive coil is decreased slowly so as to reduce the noise.

BRIEF DESCRIPTION OF THE DRAWINGS

The present invention will be more apparent from the following detailed description, when taken in conjunction with the accompanying drawings, in which:

FIG. 14 is a perspective view of a personal computer in which the hard disk drive device of the invention is built in.

DETAILED DESCRIPTION OF THE PREFERRED EMBODIMENTS

A first embodiment of the invention will be described below with reference to FIGS. 1 to 7.

Figure 1:
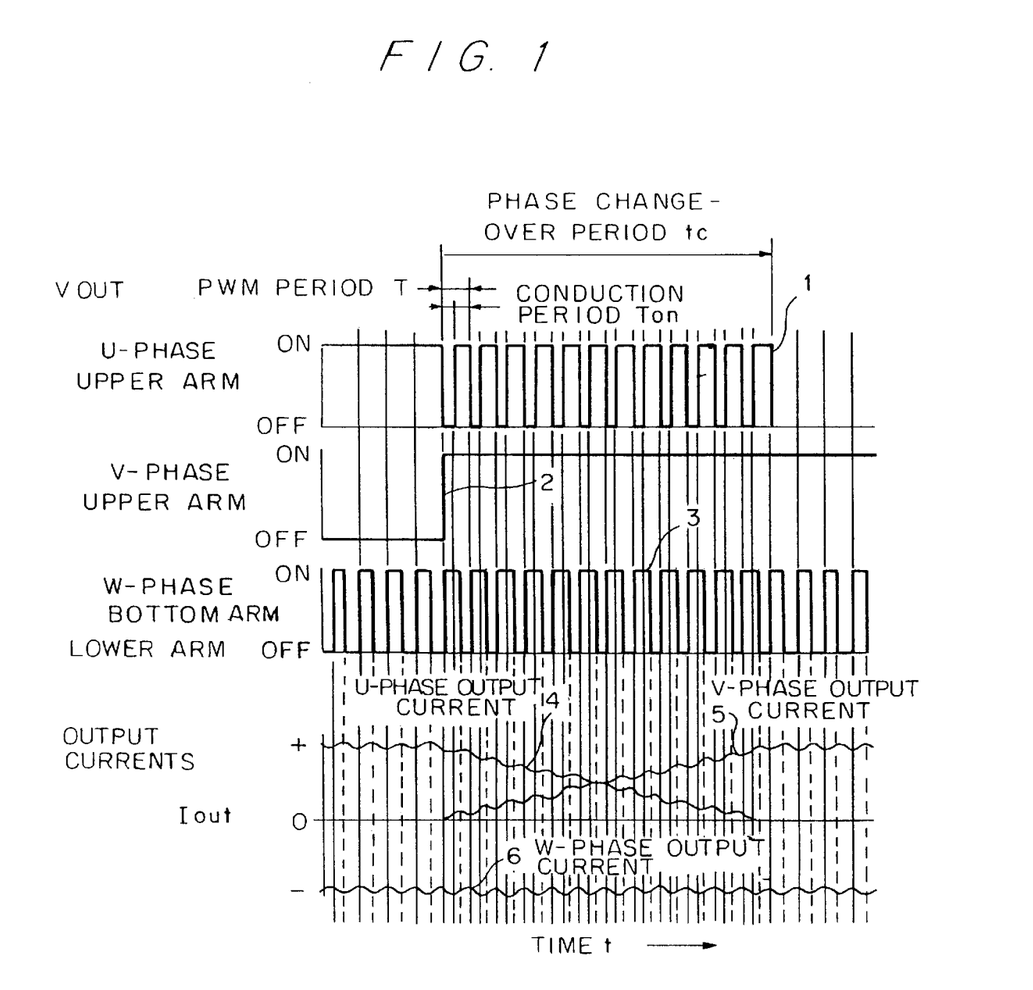
FIG. 1 is a diagram indicative of drive timings of the first embodiment according to the invention.

FIG. 1 shows drive timing during phase change-over for switching elements in a three-phase motor drive system of a typical embodiment of the invention. The tc is a transient term in which an arm of a phase is changing its status from entire ON to entire OFF. The T is a cycle of PWM waveform. The Ton is a term of the ON state during the PWM operation. Numeral 1 is a voltage waveform for driving the upper arm switching element of the phase U among the three-phase bridge circuits, which is now changing from a conduction phase to a non-conduction phase. 2 is a voltage waveform for driving the upper arm switching element of the phase V, which is changing, contrary to 1, from the non-conduction phase to the conduction phase. 3 is a voltage waveform for driving the lower arm switching element of the phase W, which repeats a conduction state and a non-conduction state with an arbitrary conduction period in order to obtain an output current for carrying out so-called PWM control. 4 is a U-phase output current, 5 is a V-phase output current, and 6 is a W-phase output current, which are obtained as a result of the above drive method operation. The other switching elements are in cut-off state.

The unique feature of the present invention is that the conduction state of 1 and the conduction state of 2 are adapted to overlap with each other for a certain time and in addition that the conduction state of 1 during this overlap period is adapted to repeat a cut off of its conduction state for an arbitrary period of time and a recovery of its conduction state (this operation will be referred to as "conduction period control"), so as to realize a soft switching by moderating the rise and fall of the output currents at the time of switching.

Now, with reference to FIG. 1, the principle of the soft switching according to this embodiment of the invention will be described below. Each switching element will assume one of the following four operational states during the conduction period control of FIG. 1 for one cycle of PWM control.

(1) U-phase upper arm in cut-off state, W-phase lower arm in conduction, (2) U-phase upper arm in conduction, W-phase lower arm in conduction, (3) U-phase upper arm in conduction, W-phase lower arm in cut-off state, and (4) U-phase upper arm in cut-off state, W-phase lower arm in cut-off state.

Since the V-phase upper arm is always in ON state during the conduction period control, if the W-phase output current is held at a constant value, a V-phase output current is determined as follows.

(V-phase output current)=(W-phase output current)−(U-phase output current)     (eq. 1)

It is known from eq. 1 that assuming the W-phase output current is constant, the rise of the V-phase output current can be moderated by moderating the fall of the U-phase output current. Thereby, we focus on the fall of the U-phase output current here. Of the four operational states described above, the current of (2) is a charge current which flows between the power source and the earth, and which increases in accordance with the time constant of the motor coil and the resistor. The other currents are discharge currents of energy stored in the coil which decreases with time. Here, the U-phase current through a repetitive cycle of increase and decrease can be decreased in moderate by setting the conduction period Ton of the U-phase to be shorter graduary, i.e., by increasing the discharge period in the repetition. By such arrangement and operation, the fall of the U-phase current as well as the rise of the V-phase current can be moderated substantially.

Figure 2:
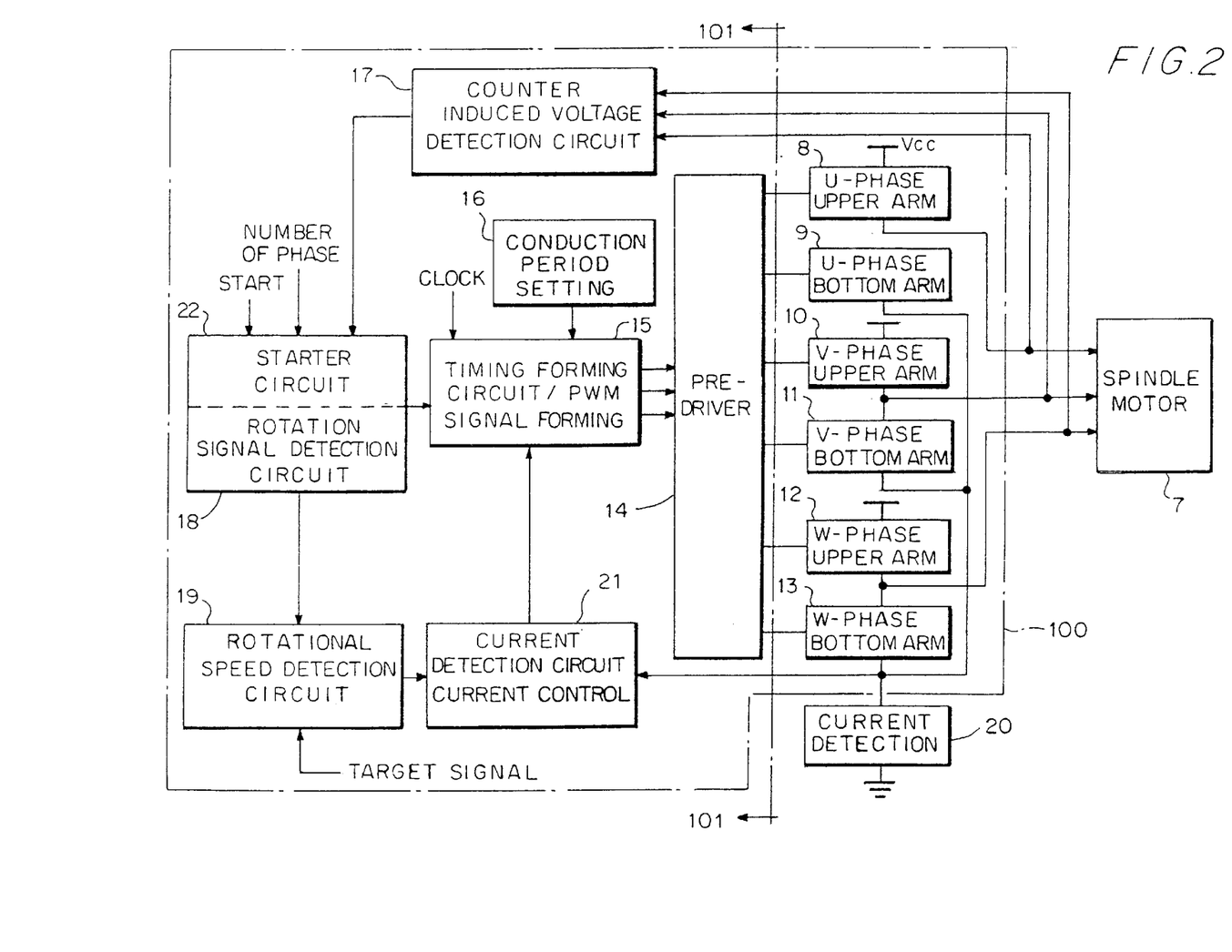
FIG. 2 is a schematic diagram indicative of the system configuration of a motor driver of the first embodiment according to the invention.

FIG. 2 shows a schematic system configuration of a spindle motor driver integrated circuit for use in a 3.5 inch hard disk provided with the means for implementing the drive timing of FIG.1.

In FIG. 2, numeral 100 denotes a schematic arrangement of a driver integrated circuit, 7 a spindle motor, 8–13 switching elements for the upper and lower arms of each phase, 14 a pre-driver for the switching elements, 15 a timing generation circuit, 16 a circuit for setting a condition for executing the drive operation of FIG. 1, 17 a detection circuit for detecting a counter-induced voltage induced by motor rotation, 18 a rotational signal detection circuit, 19 a rotational speed detection circuit, 20 a current detection circuit for detecting an output current, 21 a current control circuit, and 22 a starter circuit.

The function of some of them are as follows. The timing generation circuit 15 forms a pulse width modulation signal and a phase switching timing. The rotational signal detection circuit 18 produces a pulse signal proportional to the number of revolutions of the motor detected by 17. The rotational speed detection circuit 19 produces a command signal whether to increase or decrease the number of revolutions by comparing the number of pulses of the pulse signal with the number corresponding to a target value of the number of rotations. The current control circuit 21 produces an output current control signal to the circuit 15 to increase or decrease the number of rotations in response to a command from 19. The starter circuit 22 starts the motor at a standstill in response to a start signal.

The starter circuit 22 can be set to the number of phases according to the number of the phases of the motor. Since the switching elements 8–13 for use in the upper and lower arms of each phase have relatively large current capacity to allow a greater current to flow therethrough than that of the circuit elements in 14 and the like, the size thereof may sometimes become too large to be accommodated in the driver integrated circuit (chip) 100. In such a case, the left side circuit portion and the right side circuit portion which includes switching elements for the upper and lower arms separated by line 101 may be assembled into separate integrated circuits respectively.

Figure 3:
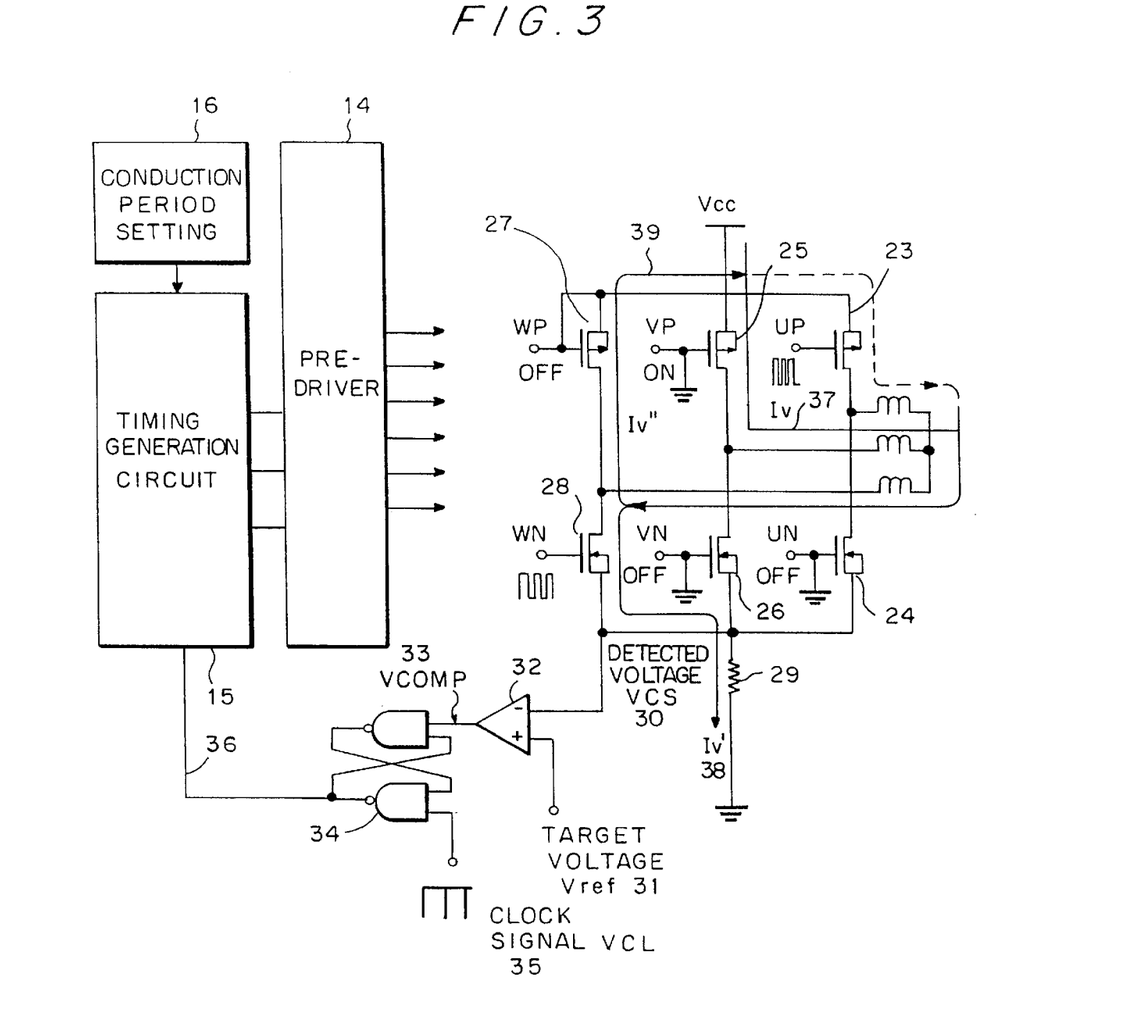
FIG. 3 is a block diagram indicative of the output section and the input section of the system of the first embodiment of the invention.

FIG. 3 shows details of the output unit and the current control unit in this system. In FIG. 3, power MOS FETs are used as switching elements for outputting each phase current output, and the currents are caused to flow mainly in W-phase and U-phase now. Numerals 23, 25, 27 denote p-channel power MOS transistors in the upper arms of respective phases, 24, 26, 28 n-channel power MOS transistors in the lower arms of respective phases, 29 a current detection resistor, 30 a current detection voltage Vcs, 31 a target voltage Vref, 32 a comparator, 33 a post-comparison signal Vcomp, 34 a flip-flop circuit, 35 a clock signal Vcl of a PWM period, 36 a PWM control signal, 37 a V-phase output current Iv, 38 a charge current Iv', and 39 a circulating current Iv" (discharge current). The reason why p-channel power MOS transistors are used in the output upper arms is that there is no need to boost the drive voltage higher than the power supply voltage for obtaining the power supply voltage at the drain of the p-channel power MOS transistor, thus, the circuit configuration can become more simple.

Figure 4:
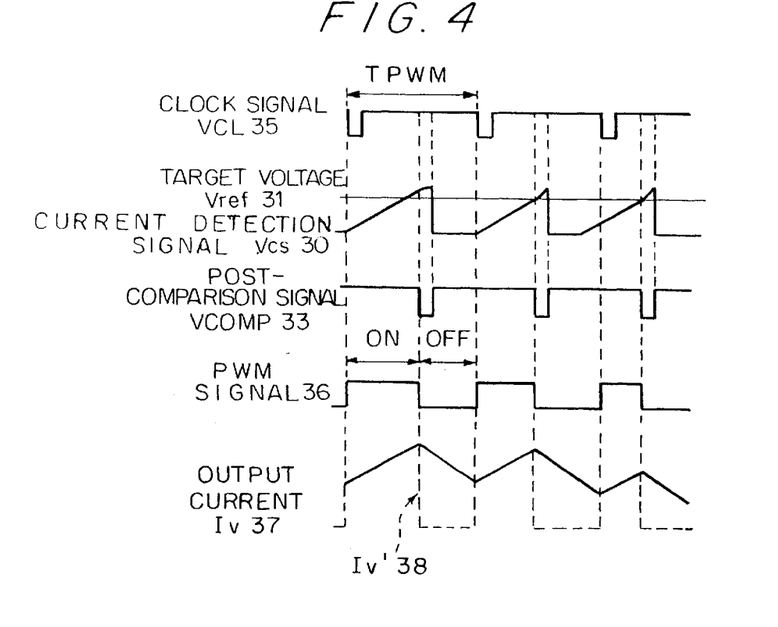
FIG. 4 is a diagram indicative of waveforms of input and output signals in the system of the first embodiment.

FIG. 4 describes waveforms of respective input and output signals and their operations in FIG. 3. Flip flop 34 changes over at the timing of clock signal 35 of the PWM period to cause PWM control signal 36 to become high and to cause lower arm transistor 28 to become conductive. Then, an output current Iv (charge current) is caused to flow, and when a detected voltage 30 produced across the current detection resistor 29 exceeds the target voltage Vref 31, the output 33 from the comparator 32 is reversed, thereby the flip flop 34 changes over again causing PWM control signal 36 to become low. During the low period, the transistor 28 in the lower arm is cut off, thereby the circulating current Iv" (discharge current) 39 flows as an output current. Then, again, the clock signal 35 turns on the transistor. This cycle of operation is repeated thereafter. Through this control operation, an output current corresponding to the target voltage can be obtained. The fact that a constant output current is obtainable means that the torque of the motor is maintained constant, and the noise due to wow and flutter of the motor is reduced.

When the V-phase upper arm transistor is switched to ON state, if the U-phase upper arm transistor is turned off completely, there occurs such a problem that while a current tends to keep flowing through the coil corresponding to U-phase, a current does not start to flow through the coil corresponding to the V-phase immediately. Therefore, in this invention, even after the V-phase upper arm transistor is switched to ON state, the U-phase upper arm transistor is changed over between the ON and OFF states repeatedly so as to moderate the rate of current change.

Figure 5:
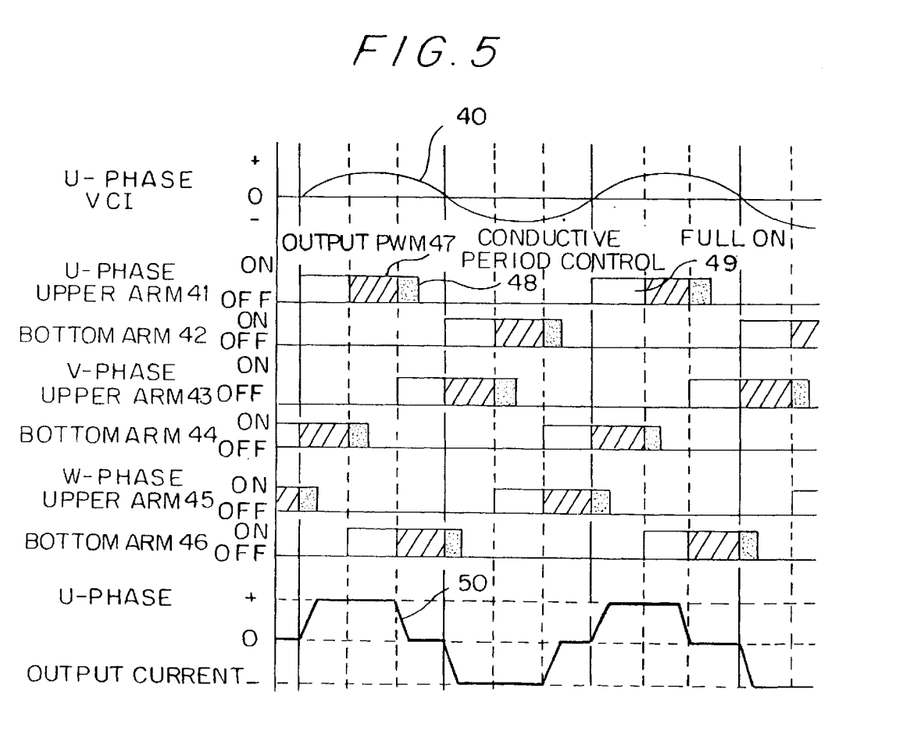
FIG. 5 is a diagram indicative of drive timings for output transistors of the first embodiment according to the invention.

FIG. 5 shows overall drive timing for these switching elements. In FIG. 5, numeral 40 denotes a counter induced voltage (Vci) waveform of the U-phase, 41–46 drive timings of the upper and lower arms of each phase, 47 a PWM control period in the drive timing, 48 a conduction period control term (which is corresponding to the transient term tc in FIG. 1) for effecting a soft switching which is the feature of the invention, 49 a full conduction period, and 50 a U-phase output current. In each phase, full conduction, PWM control and conduction period control terms are performed in sequence. Here, when any transistor for PWM control is in cut-off state, a circulating current is adapted to flow through the body diode of the other transistor in the same phase (that is, the upper arm with respect to the lower arm or vice versa). In order to eliminate power loss in the diode, the transistor may be turned on only during circulation to allow the circulating current to flow through the channel thereof.

Figure 6A:
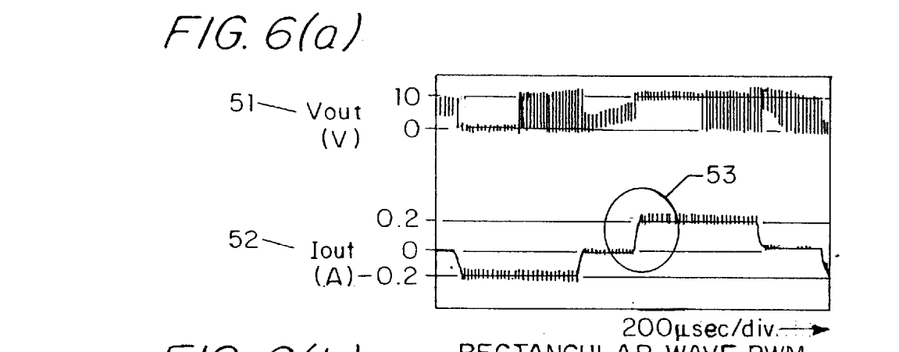
FIGS. 6A and B are diagrams indicative of output current characteristics of the first embodiment.
Figure 6B:
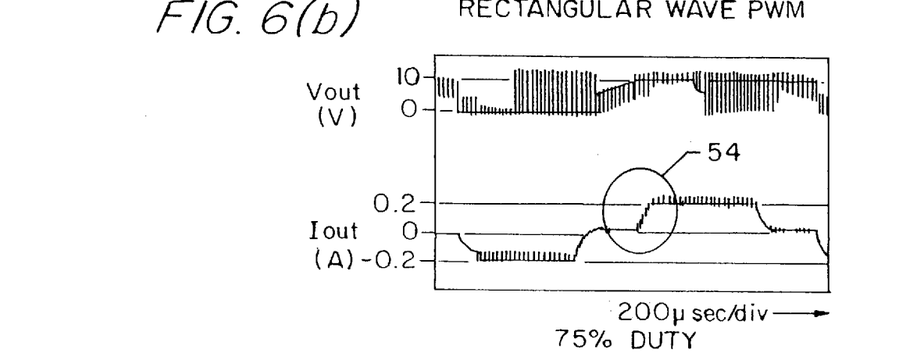

FIG. 6 shows waveforms of output voltages and currents obtained by driving a motor using the embodiment of the invention. The motor used in this operation is for driving a 3.5 inch HDD, which has a rated number of revolutions of 5400 rpm, a power voltage of 12 V, a drive current of about 0.2 A, 12 poles, an mutual inductance of 0.86 mH, and an interphase resistance of 5.5 ohm. The drive current frequency is 540 Hz in this case. The PWM drive frequency is 156 kHz (with a period of 6.4 $\mu$s). This frequency is one over the sixth power of two of 10 MHz(10 MHz/$2^6$), where 10 MHz is a clock frequency of a microprocessor for an HDD. With respect to the conduction period control term for effecting the soft switching according to the invention, the overlap period is set to 76.8 $\mu$s (an electrical angle of about 15 degrees), where 617 $\mu$s is for the period of an electrical angle of 120 degrees. This overlap period of time is 12 times the PWM period (76.8$\mu$s=6.4$\mu$s(12). Further, the ratio of the conduction period of timed (referred to as on-duty) to the PWM period (6.4 $\mu$s) is set to 75% (4.8 $\mu$s). In FIG. 6, numeral 51 denotes a U-phase output voltage, 52 an output current waveform, and (a) the case where a conventional rectangular wave PWM drive is used (without a snubber circuit), while (b) the case where the drive method of the invention was used. In the case of (a), the rise and fall of the output current is steep as enclosed by a circle 53 having a gradient of about 7A/ms. On the other hand, in the case of (b), the gradient of rise and fall as enclosed by 54 is moderated to be 2A/ms, thereby realizing a moderate rise and fall characteristic.

Figure 7:
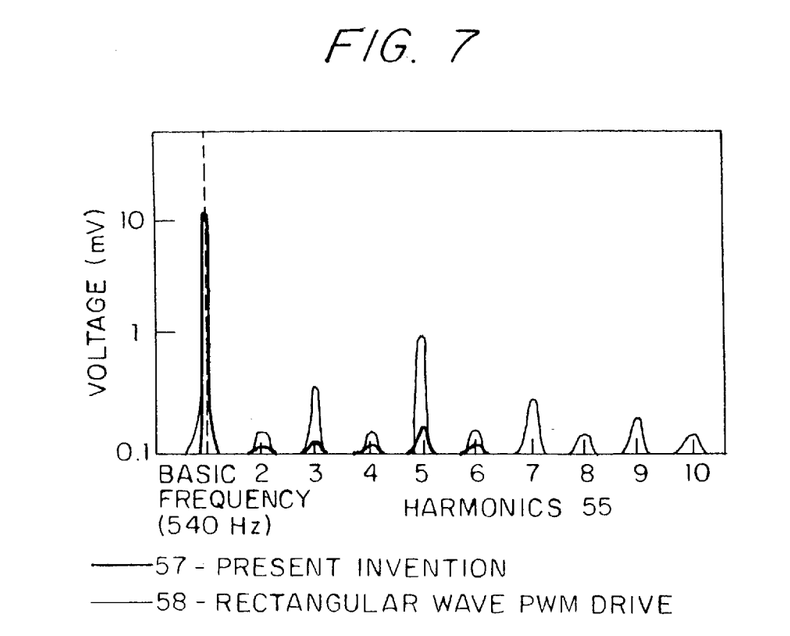
FIG. 7 is a diagram indicative of the result of analysis of frequency components in the output current of the first embodiment according to the invention.

FIG. 7 shows the advantage of this soft switching. In FIG. 7 shows the result of analysis of each harmonic level obtained by measurement of frequency components of the output current using a spectral analyzer. Numeral 55 indicates the orders of harmonics (the numbers stand for how many times of the basic frequency 540 Hz), 56 voltage conversion values of current levels of harmonics, 57 the result of measurement in the case of soft switching according to the invention, and 58 the result of measurement in the case of the conventional rectangular PWM drive operation (without use of any snubber circuit). Harmonics are greater at odd orders than at even ones. However, according to the embodiment of the invention, harmonic components in the audible frequency range from several kHz to tens of kHz decreased substantially. This means substantial alleviation of the noise generated during motor operation and proves the advantage of the soft switching to reduce the motor noise. Further, naturally, the PWM drive method involves a smaller power consumption than the linear drive method, and in this embodiment, its power consumption is reduced to less than 60% of that of the linear drive. Here, in this embodiment of the invention, the overlap time is set constant (76.8 $\mu$s) irrespective of the motor speed. However, since the time to measure the counter induced voltage (the electrical angle of 60 degrees -(minus) 76.8 $\mu$s) may not be enough when the motor speed increases, it is contemplated to change the overlap period such that the electrical angle becomes a preset electrical angle, for example, 15 degrees irrespective of the rotational speed of the motor. In this case, since the time available for this measurement corresponds to 45 degree electrical angle, a permissible range of the rotational speed is broadened accordingly. Further, in this embodiment, the on-duty is set constant to 75% irrespective of the rotational speed of the motor even if the rotational speed increases. It is, however, contemplated to decrease the on-duty gradually in consideration of an influence of the induced voltage on the output current and the rotational speed. In this case, the current change becomes more moderate.

Figure 8:
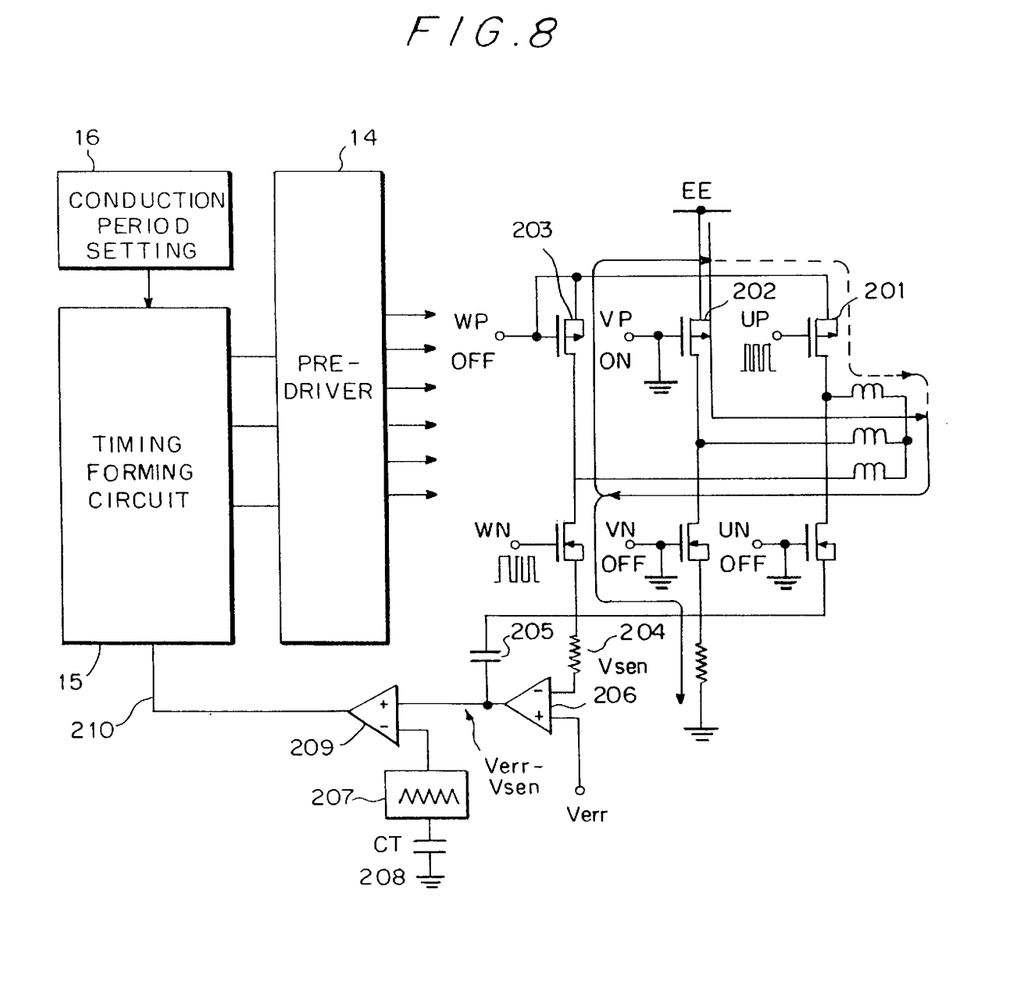
FIG. 8 is a schematic block diagram of the system configuration of a motor driver of the second embodiment according to the invention.
Figure 9:
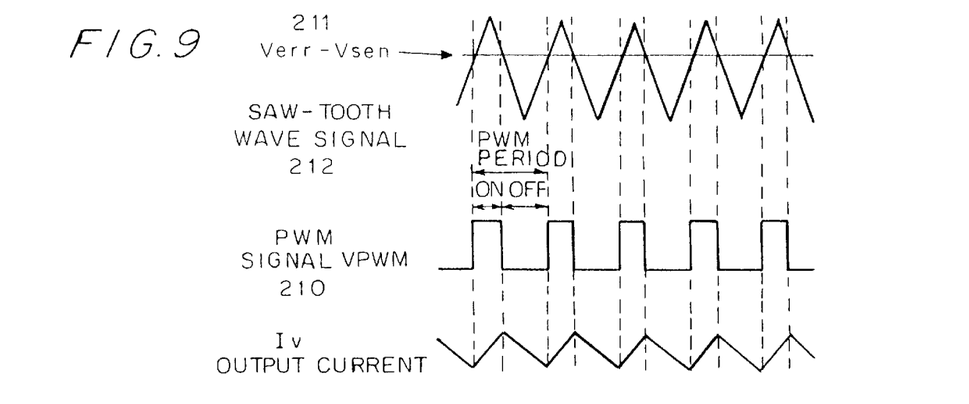
FIG. 9 is a diagram indicative of waveforms of input and output signals in the system of the second embodiment according to the invention.

With reference to FIG. 8, there will be described a second embodiment of the invention. In FIG. 8 is illustrated a schematic block diagram of a system configuration of a driver circuit of a second embodiment of the invention in which the snubber circuit of the conventional PWM drive method is eliminated. In the drawing, numerals 201–203 denotes p-channel power MOS FETs in the upper arms of each phase, 204 and 205 a resistor and a capacitor respectively for Miller integration, 206 an error amplifier, 207 a saw-tooth wave generator, 208 a capacitor therefor, 209 a comparator, and 210 a PWM control signal. Input and output signal waveforms in this system are illustrated in FIG. 9, and the operation of this system will be described with reference to FIG. 9. According to the invention, a current detection voltage is integrated by the resistor 204 and the capacitor 205 (where the integrated (average) voltage is Vsen), which is compared with a target voltage Verr to produce an error voltage 211. Then, voltage level comparison of the error voltage 211 with saw-tooth voltage 212 of a PWM period is carried out in the comparator 209 to produce a PWM control signal Vpwm 210 thereby causing the output transistors to become conductive or to be cut off. Thus, it becomes possible to control the output current Iv as desired. Since conduction period set means 16 is provided in this system likewise in the first embodiment, soft switching of the output current can be realized without use of any snubber circuit.

Figure 10:
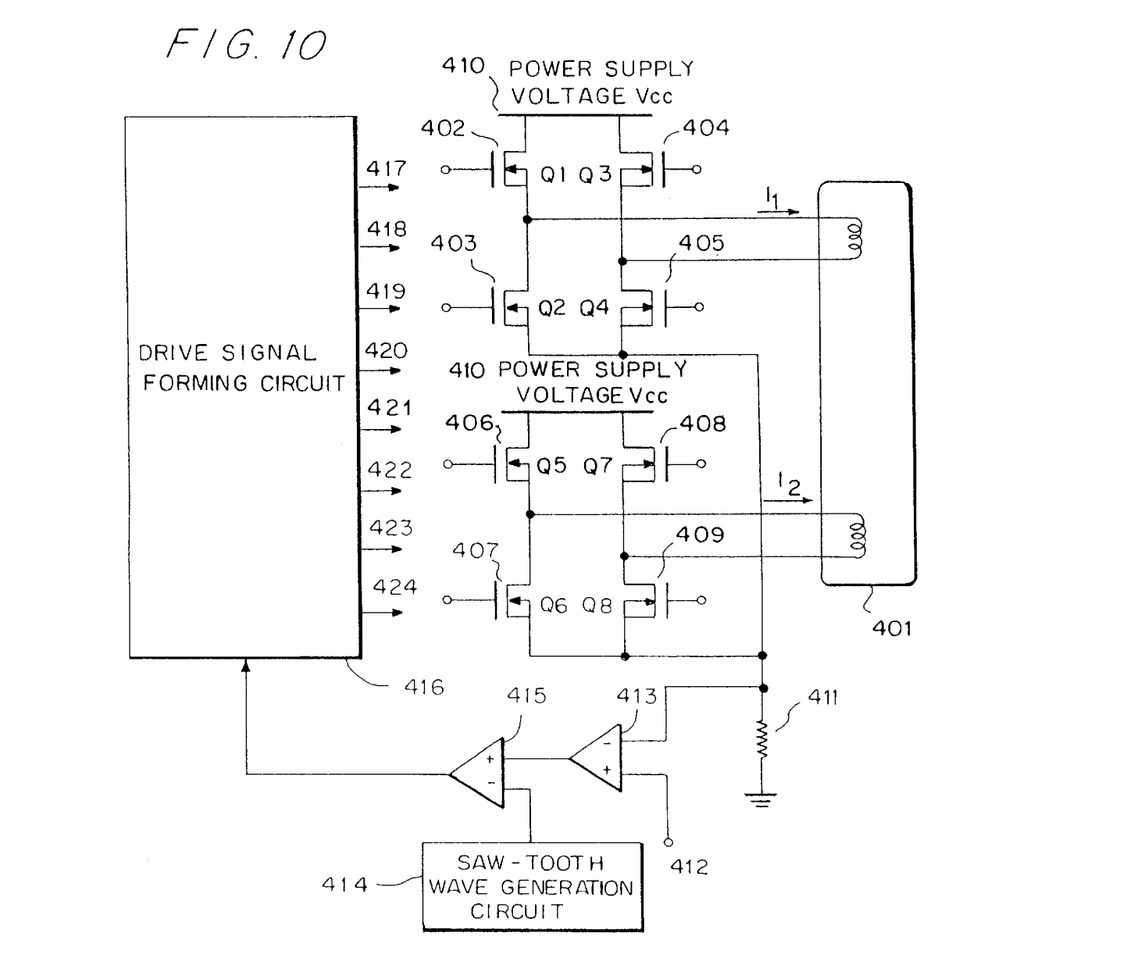
FIG. 10 is a schematic block diagram of the system configuration of a two-phase motor driver of the third embodiment according to the invention.
Figure 11:
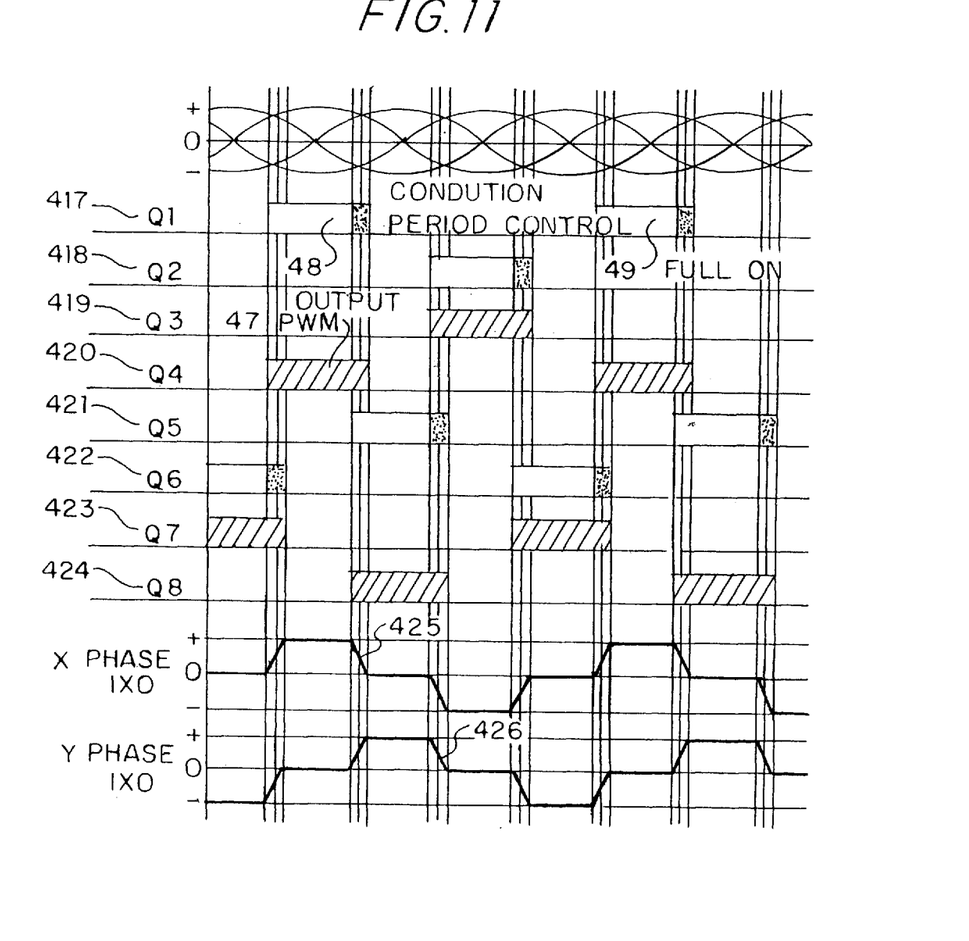
FIG. 11 is a diagram indicative of drive timings for output transistors of the third embodiment.

With reference to FIG. 10, a third embodiment of the invention will be set forth. FIG. 10 is a schematic block diagram showing the a system configuration of a two-phase motor driver for use in a paper transfer mechanism for a printer. In this system, unlike a three-phase driver, each of two-phases is driven by an H-type bridge circuit. In the drawing of FIG. 10, numeral 401 denotes a two-phase motor, 402 to 405 switching elements constituting an H-type bridge for driving the X phase, and 406 to 409 switching elements constituting an H-type bridge for driving the Y phase. Further, 410 denotes a power supply voltage Vcc, 411 a resistor for use in current detection to be shared by two H-type bridges, 412 a reference voltage for obtaining a target current level, 413 a buffer amplifier for comparing current detection result with the reference voltage, 414 a saw-tooth wave generator for PWM drive, 415 a comparator for producing a PWM control signal in accordance with the difference between the result of output from the buffer amplifier and the saw-tooth wave signal, 416 a driver signal forming circuit for driving each bridge circuit in response to the PWM control signal, and 417 to 424 driver signals therefrom. The drive timings for the switching elements in this system are shown in FIG. 11. In the drawing, numeral 425 denotes an X-phase output current Ixo, and 426 a Y-phase output current Iyo. The feature of this embodiment is that the PWM control during phase change-over is carried out by two switching elements. Namely, by carrying out the current detection at one place, and controlling this two switching elements simultaneously, the same effect and advantages as in the first embodiment are obtained. The counter induced voltage at a coil of the motor in this embodiment is detected while four switch elements (e.g. 402–405) are all OFF state.

In the embodiments of the invention described hereinabove, the first and second embodiments have been described as examples applied to an HDD, and the third embodiment as an example applied to the motor drive for a printer, however, they are not limited thereto, and any other applications of the same motor such as to a floppy disk drive, magneto-optical disk drive, CD-ROM drive, digital video disk drive, plain paper copier, facsimile, video camera, and home appliances such as an air-conditioner and the like should be considered to be within the scope of the present invention.

Figure 12A:
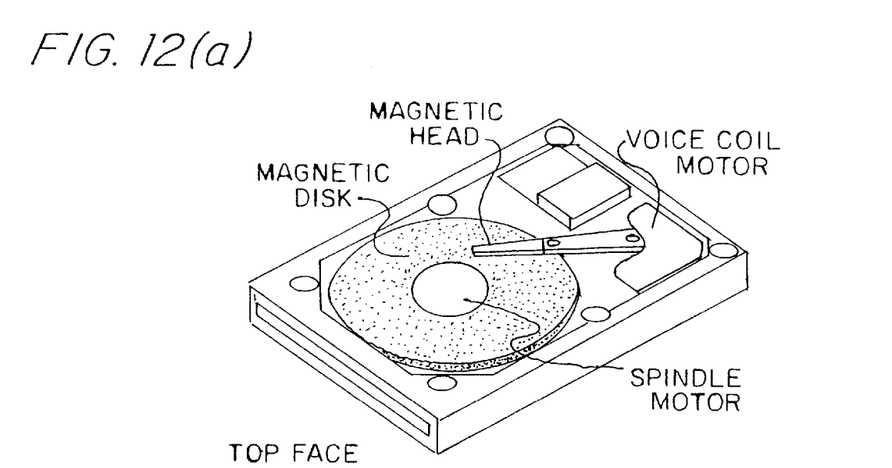
FIGS. 12A and B are perspective views of a hard disk drive which is an example of electrical device to which the present invention is applied.
Figure 12B:
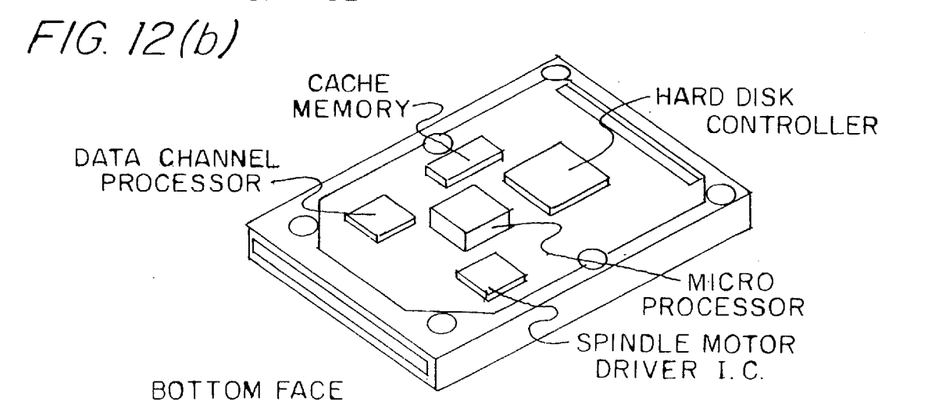

FIGS. 12A and B are perspective views of a hard disk drive which is an example of an electrical apparatus to which the present invention is applied. FIG. 12A is a top face view thereof. It shows a spindle motor, a magnetic disk rotated by the motor, magnetic head for reading information on the disk and a voice coil motor for driving an actuator of the magnetic head. FIG. 12B is a bottom face view thereof. It shows a spindle motor driver IC to drive the spindle motor, a microprocessor providing information such as the start signal, the number of phase and the target signal in FIG. 2, a data channel processor for read/write information, a hard disk controller to control communication through an interface between the hard disk and an external device such as a computer connected through AT/SCSI bus, and a cache memory for the hard disk controller (see FIG. 13).

Figure 13:
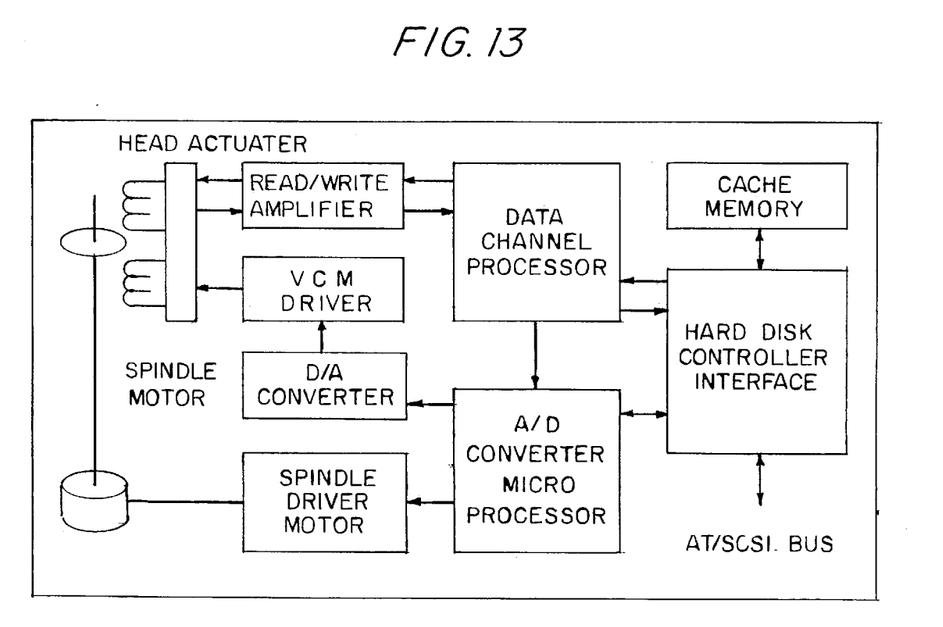
FIG. 13 is the system block diagram of the hard disk drive device.

FIG. 13 is a schematic block diagram of FIGS. 12A and B. This is a system configuration of the hard disk drive according to the invention. This further shows AD converter for converting analog data from the data channel processor, DA converter for converting a processed digital data to analog data to drive the actuator of VCM, a head actuator, a read/write amplifier for amplifying a signal from the head actuator, and VCM driver for the voice coil motor. It is clearly seen from FIGS. 12A and B that there are mounted such devices as a cache memory, microprocessor, data channel processor and the like which are susceptible to noise and prone to malfunction. Thereby, when the present invention is applied, noise due to the power supply fluctuation during the operation of the hard disk motor can be reduced and as a result malfunctioning of devices such as processors can be eliminated.

Figure 14:
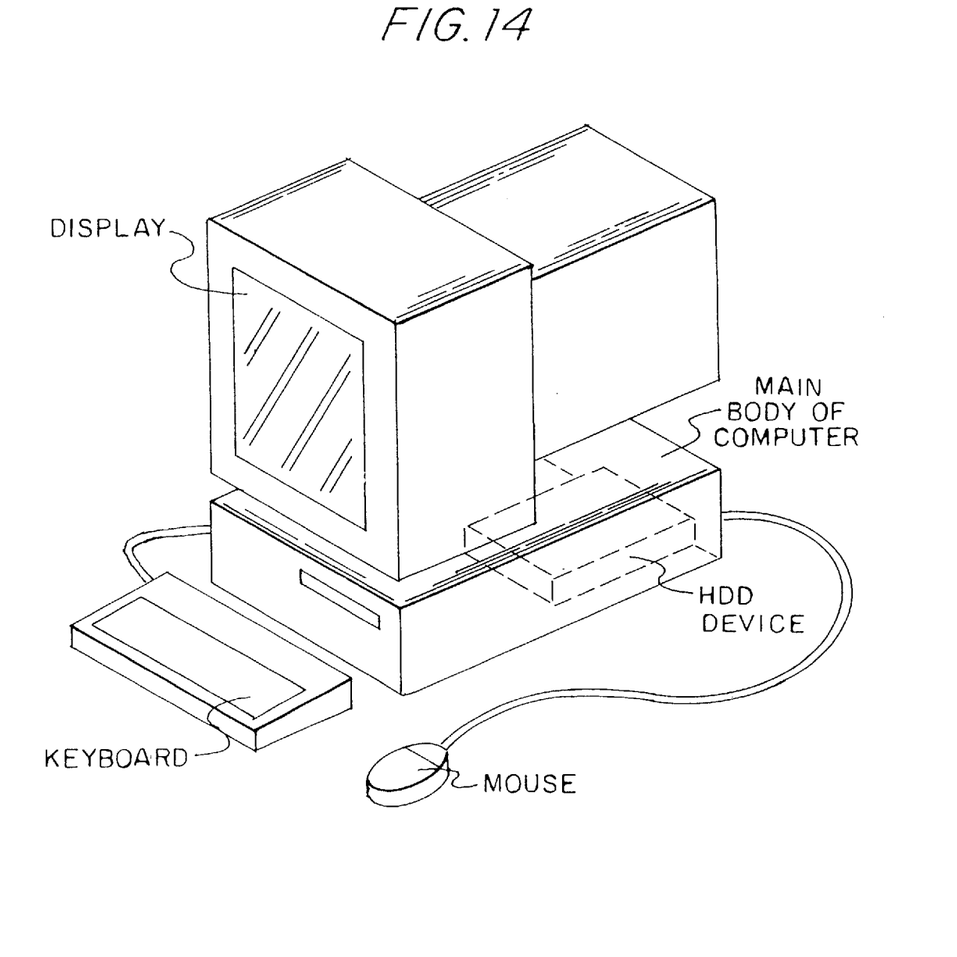

FIG. 14 is a perspective view of a personal computer in which the hard disk drive device according to the invention is built-in. This shows a main body of a computer including a hard disk drive, a display, a key board and a mouse. Even in the built-in type hard disk drive device as shown in FIG. 12, since the noise from the device adversely affects the processor which is the heart of the personal computer, the invention is obviously effective. Of course, the advantage of the invention is clear as well when applied to a personal computer in which a hard disk drive device is incorporated.

According to the present invention, the noise of the sensorless and brushless motor can be reduced greatly compared to the conventional type.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A method of driving a motor drive apparatus having first, second and third half bridge circuits, each of said first, second and third half bridge circuits having a first transistor which is adapted to form a first current path between a first operating potential and an output terminal thereof and a second transistor which is adapted to form a second current path between a second operating potential and the output terminal thereof, wherein each of the output terminals is connected to a corresponding drive coil of a motor and wherein each of said first and second transistors has a control terminal to which a control signal is supplied, said method comprising the steps of:

a first step for detecting a counter-induced voltage of said drive coil corresponding to said second half bridge circuit by supplying control signals to said second transistor of said first bridge circuit, to said first and second transistors of said second half bridle circuit and to said first transistor of said third half bridge circuit for cutting off the second current path in said second transistor of said first bridge circuit, the first and second current paths in said first and second transistors, respectively, of said second half bridge circuit and the first current path in said first transistor of said third half bridge circuit, and by supplying control signals to said first transistor of said first half bridge circuit and to said second transistor of said third half bridge circuit for forming the first current path in said first transistor of said first half bridge circuit and the second current path in said second transistor of said third half bridge circuit respectively, and a second step for cutting off the first current path in said first transistor of said first half bridge circuit, for forming the first current path in said first transistor of said first half bridge circuit and for cutting off again the first current path in said first transistor of said first half bridge circuit by supplying control signals to said first transistor of said first half bridge circuit after start of supplying a control signal to said first transistor in said second half bridge circuit for forming the first current path in said first transistor of said second half bridge circuit, wherein a control signal for forming the second current path in said second transistor of said third half bridge circuit is supplied to the control terminal of said second transistor of said third half bridge circuit.

2. A method of driving a motor according to claim 1, wherein a predetermined electrical angle determines a period of time for which the control signal for forming the first current path in said first transistor of said first half bridge circuit is supplied after the start of supplying the control signal for forming the first current path in said first transistor of the second half bridge circuit.

3. A method of driving a motor according to claim 1, wherein said control signals for cutting off the first current path in said first transistor of said first half bridge circuit, for forming the first current path in said first transistor of said first half bridge circuit and for cutting off again the first current path in said first transistor of said first half bridge circuit are repeated after the start of supplying the control signal for forming the current path in the first transistor of said second half bridge circuit, and the ratio of the period of time during which the first current path in said first transistor of said first half bridge circuit is formed to the period of time during which the first current path in said first transistor of said first half bridge circuit is cut off decreases in accordance with the number of repetitions of a cycle of said step of cutting off, said forming and said cutting off again of said first current path in said first transistor of said first half bridge circuit.

4. A method of driving a motor according to claim 1, further comprising:

a third step for cutting off the second current path in said second transistor of said third half bridge circuit, for forming the second current path in said second transistor of said third half bridge circuit and for cutting off again the second current path in said second transistor of said third half bridge circuit by supplying a control signal to said second transistor of said third half bridge circuit after start of supplying a control signal for forming the second current path in said second transistor of said first half bridge circuit, wherein a control signal for forming the first current path in said first transistor of said second half bridge circuit is supplied to the control terminal of said first transistor of said second half bridge circuit.

5. A method of driving a motor according to claim 1, wherein said motor controls one of a hard disk drive, a floppy disk drive, a magnet-optical disk drive, a CD-ROM drive, a digital video disk drive, a plain paper copier, a printer, a facsimile, a video camera and an air conditioner.

* * * * *